United States Patent [19]
Rhême

[11] Patent Number: 5,182,612
[45] Date of Patent: Jan. 26, 1993

[54] METHOD OF MEASUREMENT OF AN ANGLE OF INCIDENCE OF A LUMINOUS BEAM, MEASURING DEVICE FOR CARRYING OUT THE METHOD AND USE OF THE DEVICE FOR THE MEASUREMENT OF DISTANCES

[76] Inventor: Charles Rhême, Le Coutset, CH - 1725 Posieux, Switzerland

[21] Appl. No.: 704,449

[22] Filed: May 23, 1991

[30] Foreign Application Priority Data

May 23, 1990 [CH] Switzerland ............... 01772/90

[51] Int. Cl.⁵ .................................. G01B 9/02
[52] U.S. Cl. ...................... 356/351; 356/363; 356/358; 356/353
[58] Field of Search ............. 356/351, 358, 365, 353, 356/363

[56] References Cited

U.S. PATENT DOCUMENTS 4,624,563 11/1986 Johnson ................. 356/365

Primary Examiner—Samuel A. Turner
Assistant Examiner—Richard E. Kurtz, II
Attorney, Agent, or Firm—Ostrolenk, Faber, Gerb & Soffen

[57] ABSTRACT

For measuring an angle of incidence of a luminous beam, one employs a polarized luminous beam which is brought to pass though a birefringent plate followed by an analyzing polarizer, in order to obtain succession of fringes of interference, and one analyzes by means of an appropriate detector and an electronic circuit the spacings between the crests of said fringes, said spacings being a direct function of the angle to be measured. One can utilize a measuring device of an angle of incidence for measuring the distance between said device and a reflecting surface of the object to be measured, by determining for a certain position of the object a spacing of reference between the crests of the fringes of interference and by measuring the variations of the spacings as a function of the position of the object, in order to display them in units of length.

23 Claims, 3 Drawing Sheets

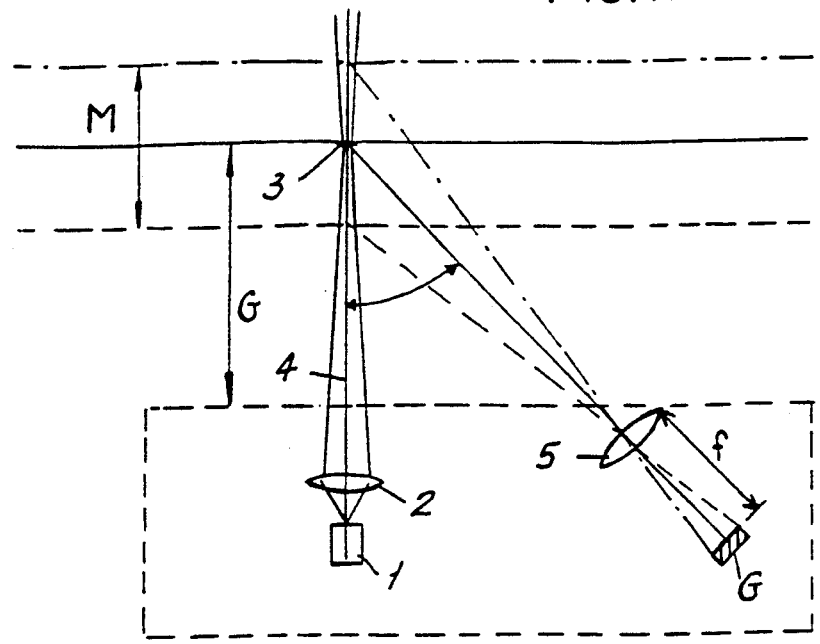
FIG. 1.
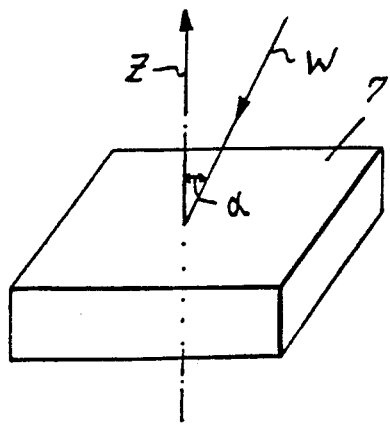
FIG. 2.
FIG. 3.
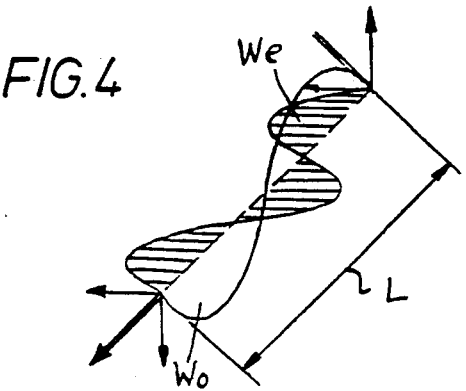
FIG. 4

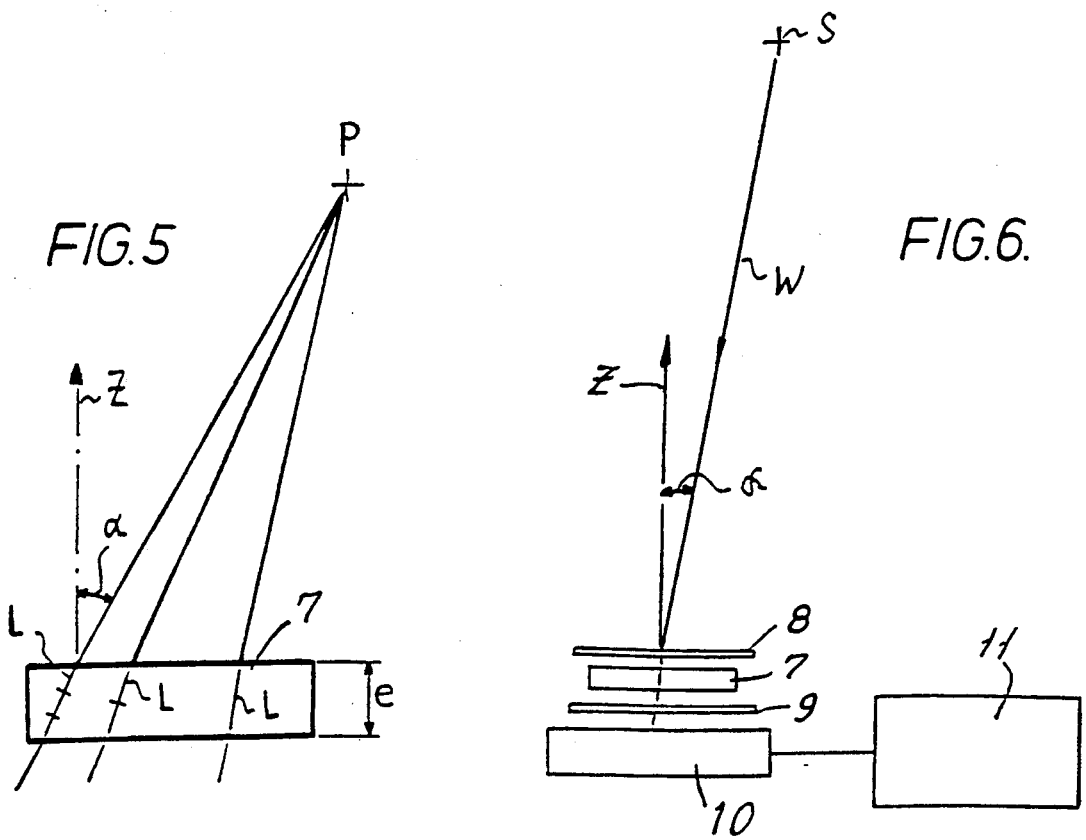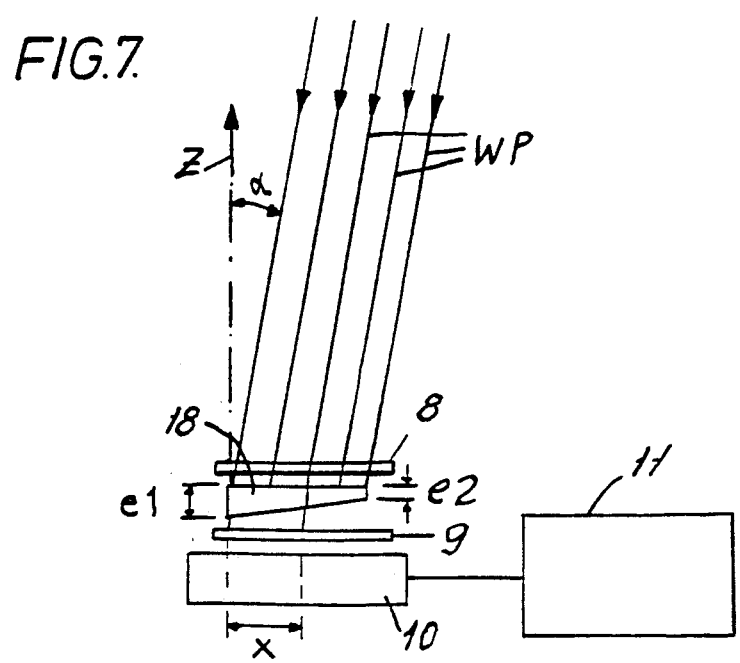

METHOD OF MEASUREMENT OF AN ANGLE OF INCIDENCE OF A LUMINOUS BEAM, MEASURING DEVICE FOR CARRYING OUT THE METHOD AND USE OF THE DEVICE FOR THE MEASUREMENT OF DISTANCES

BACKGROUND OF THE INVENTION

There exist a great number of methods and devices for measuring by optical means either an angle of incidence of a luminous beam or distances between an object and a detector. For the measurement of great distances and of great accuracy, one uses normally a laser by means of which one executes either a measurement of time for objects at great distances or an analysis of interference fringes for obtaining a great precision. For the measurement of short distances and on machines where a very great accuracy is not required, one works generally in accordance with the principle of triangulation which will be described hereunder, according to FIG. 1. This principle of triangulation necessitates an important base for obtaining a sufficient accuracy and this gives rise principally to a strong limitation of the measuring range due to the determined optical arrangement. These disadvantages are particularly annoying in the case where one is obliged to arrange the whole within a transducer of the smallest possible dimensions, in order to fix it on a machine tool or similar. This transducer must comprise the source of light and the receiver if possible in the same housing, the space taken of which must be as small as possible because the space at disposal is often very limited.

SUMMARY OF THE INVENTION

It is therefore a first object of the invention to give a method of measurement of an angle of incidence of a simple luminous beam, permitting the construction of a device the space taken of which being appreciably reduced as compared with the known devices. There is another object of the present invention which is to utilize this device having a reduced bulkiness for measuring distances with a good precision and a measuring range greater than the one of the devices working according to the principle of triangulation. These objects are attained by a measuring method, a measuring device and the use of the device as claimed.

The method for measuring the angle of incidence of a luminous beam is characterized in that one uses the polarized luminous beam that is brought to pass through a birefringent plate followed by a polarizer analyzer in order to obtain a succession of interference fringes and in that one analyses the spacing between the crests of said fringes by means of an appropriate detector and an analysing electronic circuit, said spacing being a direct function of the angle to be measured.

The device for carrying out the method is characterized by a birefringent plate and a polarizer analyzer, a detector of the variations of the luminous intensity and an analyzing electronic circuit.

The use of the device for the measurement of the distance between this device and a reflecting surface of the object to be measured is characterized in that one determines for a certain position of the object the spacing of reference between the crests of the interference fringes and in that one measures the variations of the spacings as a function of the positions of the object, in order to set them at disposal in units of length.

BRIEF DESCRIPTION OF THE DRAWINGS

The invention will be explained further in detail by reference to the enclosed drawings which illustrate embodiments of the object of the invention.

FIG. 1 shows schematically the method for measuring distances by triangulation, in accordance with the prior art, FIG. 2 shows schematically a birefringent plate, FIG. 3 shows variations of the extraordinary index as a function of the angle of incidence, FIG. 4 shows the separation of a light wave into two rays, FIG. 5 shows schematically the dependency of the spacing of the fringes of interference on the angle to be measured, FIG. 6 shows the principle of a measuring device of the angle of incidence, FIG. 7 shows the principle fo a second measuring device of the angle of incidence.

DETAILED DESCRIPTION OF THE INVENTION

Figure 8:
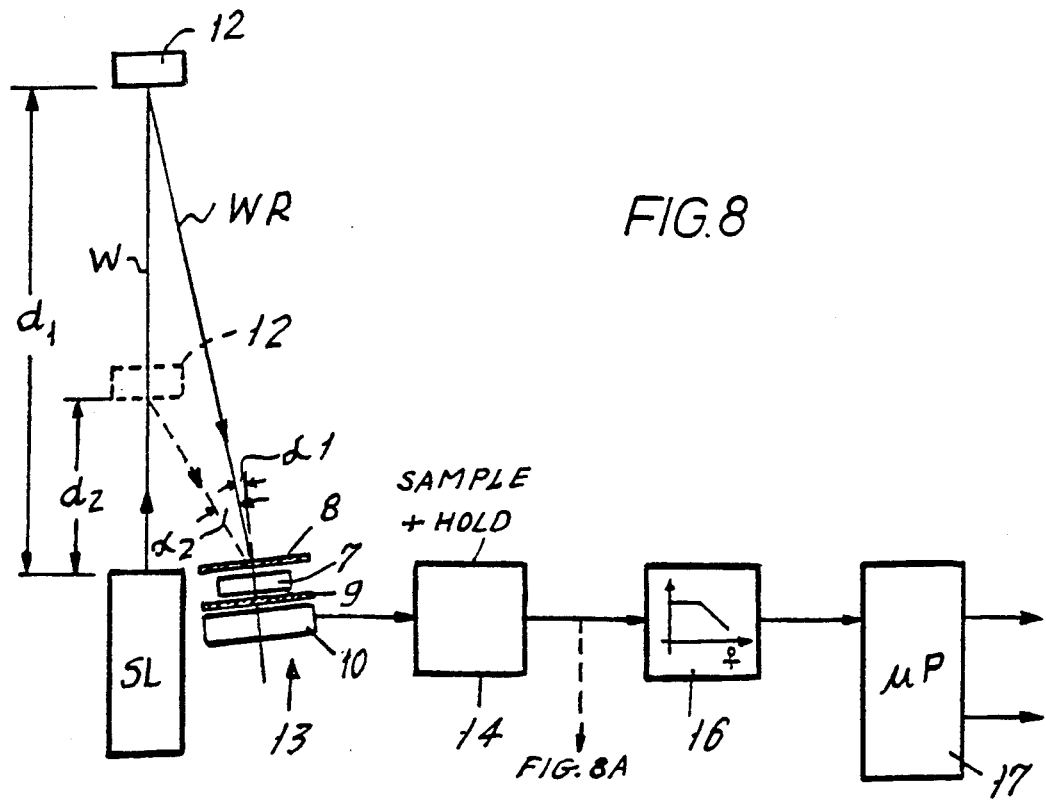
FIGS. 8, 8A show schematically a device for the measurement of distances.
Figure 8A:
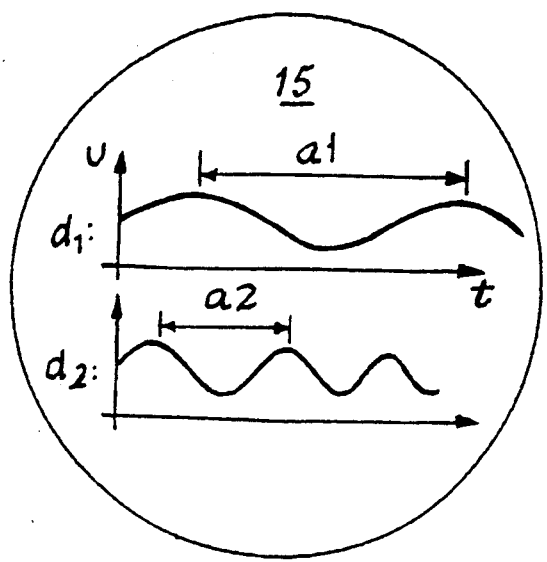

FIG. 1 shows the principle of the measurement of distance by triangulation and one can appreciate the space taken by the transducer C shown in the dotted right-angle. One recognizes a laser diode 1, a focussing lens 2 and the object to be measured 3, resp. the reference level. The light of the beam 4 of the laser diode is reflected by the object 3 and passes through an image lens 5 for being received on a detector 6 sensitive to the position. One sees that the measuring range M is relatively limited and that the basic distance G is relatively great. This means that the possibilities of applications of this system are limited.

FIG. 2 shows a birefringent plate 7 having an optical axis Z on which the light ray is received under an angle of incidence $\alpha$ which is to be measured by the present invention. The light ray which penetrates in this material under the angle $\beta$ is divided, according to the polarization, in two rays which will be submitted, the first one to the ordinary refractive index $n_o$ and the other one to the extraordinary index n, the latter varying between a value $n_e$ for $\beta = 90°$ and the value corresponding to the ordinary refractive index $n_o$. The first index is constant while the second varies as a function of the angle $\beta$ and it can be calculated by the formula:

$$n = \frac{1}{\sqrt{\frac{\sin^2 \beta}{n_e^2} + \frac{\cos^2 \beta}{n_o^2}}}$$

Let us examine now a linearly polarized light wave which separates into an ordinary ray Wo and an extraordinary ray We, these rays propagating at different speeds in the birefringent material (FIG. 4). After a distance producing a relative phase shift of one half-wave length between Wo (FIG. 4) and We, one sees that the plane of polarization of the recombined wave has undergone a rotation of 90° as schematically visible in FIG. 4.

The length L of this path is called half-wave plate; it has the value:

$$L = \frac{\lambda}{2 \cdot n_0 \cdot |n_0 - n|}$$

where $\lambda$ is the wave length of the light wave W.

The method which is proposed by the invention consists to submit a birefringent material to a polarized, monochromatic light beam. The light rays will determine half-wave plates of this material as a function of the angle of incidence. The length of these plates decreases very rapidly if the angle of the incident ray moves away from the optical axis, because the value of the variable refractive index will become more and more different from the ordinary index. Each time the thickness of the material corresponds to a number which is an integer of half-wave plates, the emerging light will have a well defined linear polarization. Between these zones, the polarization will be of circular nature. When analysing this light through a linear or circular polarizer, one will observe a succession of fringes of interference, the spacing fo which is a direct function of the angle to be measured (FIG. 5). If the polarization of the incident beam is of circular nature, it will become linear after having travelled a distance equivalent to a half-wave plate. Its behavior will then be similar to the one of the already described case.

In FIG. 5, P represents a source of polarized light, Z the optical axis, $\alpha$ the angle of incidence and one recognizes the birefringent plate 7 having a thickness e.

One recognizes in FIG. 6, schematically illustrated, a device for measuring the angle of incidence $\alpha$ of a ray W generated by a punctual source S. If this light source is not polarized, a polarizer 8 is placed before the birefringent plate 7. In order to produce the latter, one can use for example calcite or quarz. The choice of the dimensions, principally of the thickness e, depends on the desired angular range. As an example, a calcite of 1 mm thickness permits to realize measurements within a range of ten degrees.

The outgoing light of the birefringent plate 7 is analyzed through a polarizer 9, for example a polaroid which will render visible the fringes of interference. A detector 10 comprising for example a CCD light transducer permits to an electronic circuit 11 to analyse the position or the spacing of the fringes and to deliver the information about the measurement in the desired form.

For the measurement of small angular variations, it is preferred to use the measuring device according to FIG. 7 where one sees a birefringent blade 18 having a thickness capable to vary between a value e1 and e2 and to use a parallel light beam WP instead of a beam generated by a dpunctural source. In this device, the other means are the same than those of the device according to FIG. 6. By measuring the position X of the half-wave plate, one determines its length and then one calculates the angle of incidence $\alpha$. The measurement of X gives rise to a very sensitive measurement of the variations of the angle $\alpha$. Like in the first example, the mean thickness of the birefringent plate, as well as its variation must be determined as a function of the angular range and of the sensitivity of the measuring device.

The method and the device illustrated schematically above can be used advantageously for the measurement of distances between an object and the transducer comprised in a measurement device, this transducer being capable to be of reduced dimensions with respect to the transducers of distances according to the prior art. FIG. 8 shows schematically, as an example, an embodiment of a measuring device according to the invention. FIG. 8 shows the object 12 the distance of which is to be measured in two positions d1 and d2 illustrated in dotted line. In this schematic drawing, and for reason of clarity, these distances are measured between the front of the surface of the object 12 and the front part of the light source SL, for example a laser.

In practice, the emitter and the transducer are in one and the same housing and the distance is measured between a definite surface of the object to be measured and a definite face of the housing. The reflected light WR of the laser source falls on the transducer 13 consisting of a polarizer 8 if the light source is not polarized, then through the birefringent plate 7, the analyzer 9 and a phototransducer CCD 10. The distribution of the intensity of the light impinging on the phototransducer 10, that is the fringes of interference, resp. the spacing between these fringes is rendered visible by means of a sample and hold electronic circuit 14 at the output of which the distribution of the luminous intensity can be observed by an oscillographe 15 schematically illustrated by the circle enclosing two different forms of oscillation. The output of the electronic circuit 14 is connected to a band-pass filter 16 itself connected to a microprocessor 17 the output of which is connected to a display device not represented. It is clearly to be seen from FIG. 7 that the angle of incidence varies with the distance between the object to be measured and the measuring device, resp. the laser source and that the angle of incidence $\alpha_1$ is very much smaller for the object at the distance d1 than the angle of incidence $\alpha_2$ for the object at the distance d2.

As already described by means of FIG. 5, the spacing between the crests of the fringes of interference is a function of the distance and therefore the spacing a1 is greater for the distance d1 than the spacing a2 for the distance d2, as shown schematically in the circle 15 of FIG. 8.

In FIGS. 6, 7 and 8, the detector 10 of the fringes of interference is a detector of intensity profile which detects the variations of the luminous intensity at different places and at the same time. Instead of such an arrangement, it is also possible to foresee an arrangement where the angle of incidence of the luminous beam varies with the time and the measurement of the variation of the intensities is effected at one place. To this end, one imparts a periodic, angular motion to the birefringent plate by means of an electro-mechanical device. It is also possible to replace the birefringent plate by a liquid crystal showing these properties and to apply a variable electric field for obtaining a temporal variation of its axis of alignment. Both arrangements permit to utilize an appropriate detector known per se and to employ means for analysing known per se, and reliable.

An appropriate light source is for example a laser diode, preferably multimode, in order to reduce the interferences of coherence. However, it is also possible to use a monochromatic emitting diode LED, because its coherence is sufficient for the method according to the invention. Obviously, the light source is not limited to the described examples.

As a phototransducer, one called CCD is preferred for the precise measurements of luminous intensity profiles. If requirements are not too high, other phototransducers will be sufficient for these measurements.

I claim:

1. A method for measuring the angle of incidence of a luminous beam, wherein a polarized luminous beam is used which is brought to pass through a birefringent plate followed by a polarizer analyzer for obtaining a succession of fringes of interference and wherein the spacing between the crests of said fringes are analysed by means of an appropriate detector and an analyzing electronic circuit, said spacing being a direct function of the angle to be measured.

2. A method according to claim 1, wherein a local variation of luminous intensity is analysed after said polarizer analyzer by means of a detector of luminous intensity profile.

3. A method according to claim 1, wherein the temporal variation of the luminous intensity created by a periodic, angular motion of said birefringent plate is analysed and wherein a detector of essentially punctual luminous intensity is employed.

4. A method according to claim 3, wherein a periodic, angular motion is imparted to said birefringent plate by means of an electro-mechanical device.

5. A method according to claim 3, wherein a liquid crystal with birefringent properties is employed and wherein thereon a variable electric or magnetic field is applied, in order to obtain a temporal variation of its axis of alignment.

6. A method according to claim 1, wherein said incident beam is polarized by interposition of a polarizer before said birefringent plate.

7. A method according to claim 1, wherein a punctual light source is employed.

8. A method according to claim 1, wherein a parallel light beam and a birefringent plate of variable thickness is employed and wherein one determines the length of a half-wave plate by measuring its position on said detector, said length being a function of the angle of incidence.

9. A method according to claim 1, wherein said luminous beam originates from an essentially monochromatic light source.

10. A method according to claim 1, wherein said luminous beam comprises light reflected from an object.

11. A method according to claim 1, wherein a laser diode or a light emitting diode LED is employed as a light source.

12. A method according to claim 1, wherein a birefringent plate of calcite or another optically anisotropic material is employed.

13. A method according to claim 1, wherein a phototransducer CCD is used as a detector of intensity profile.

14. A measuring device for measuring the angle of incidence of a luminous beam, comprising:
a birefringent plate through which the beam is passed, a polarizer analyzer for obtaining a succession of fringes of interference, a detector of variations of luminous intensity for analyzing the spacing between the crests of said fringes and an analysing electronic circuit responsive to said detector for determining the angle of incidence based on said analysis.

15. A device according to claim 14, wherein the a polarizer is arranged before said birefringent plate.

16. A device according to claim 14 comprising an essentially monochromatic light source containing a laser, a laser diode or a light emitting diode LED.

17. A device according to claim 14, wherein the a birefringent plate has a constant thickness.

18. A device according to claim 14 wherein the birefringent plate has a variable thickness, and a source of parallel light.

19. A device according to claim 14, wherein said birefringent plate is of calcite or another optically anisotropic material.

20. A device according to claim 14, wherein said detector of variations of said luminous intensity is a detector of local luminous intensity profile.

21. A device according to claim 20, wherein said detector is a phototransducer CCD followed by a sample & hold electronic circuit connected to a band-pass filter which is connected to a microprocessor.

22. A device according to claim 14, wherein said birefringent plate is comprised in an arrangement for creating a periodic, angular motion of said birefringent plate or of its axis of alignment, to generate a time varying optical beam and the detector detects the variations in punctual luminous intensity of said time varying optical beam.

23. The method of claim 1, wherein the luminous beam is reflected from an object toward the birefringent plate, the spacing between the crests is a function of the angle of incidence of the beam which is a function of the distance of the object from the birefringent plate, and the spacing is displayed in units of length.

* * * * *